(12) United States Patent
Perkins (10) Patent No.: US 8,424,242 B2
(45) Date of Patent: Apr. 23, 2013

(54) DUAL-LINE SPOUT AND MAPLE SYRUP PRODUCTION SYSTEM USING SAME

(75) Inventor: Timothy D. Perkins, Richmond, VT (US)

(73) Assignee: University of Vermont and State Agricultural College, Burlington, VT (US)

( * ) Notice: Subject to any disclaimer, the term of this patent is extended or adjusted under 35 U.S.C. 154(b) by 609 days.

(21) Appl. No.: 12/657,341

(22) Filed: Jan. 19, 2010

(65) Prior Publication Data

US 2011/0173881 A1 Jul. 21, 2011

(51) Int. Cl.
*A01G 23/14* (2006.01)

(52) U.S. Cl.
USPC .................................................. 47/52

(58) Field of Classification Search .............. 47/52
See application file for complete search history.

(56) References Cited

U.S. PATENT DOCUMENTS

| 144,844 | A | 11/1873 | Gould et al. |
|---|---|---|---|
| 530,663 | A | 12/1894 | Shaw |
| 2,267,902 | A | 12/1941 | Eddins |
| 2,701,579 | A | 2/1955 | Hasselquist |
| 2,711,186 | A | 6/1955 | Perez |
| 2,877,601 | A | 3/1959 | Griggs |
| 2,944,369 | A | 7/1960 | Soule |
| 2,958,158 | A | 11/1960 | Hatton |
| 3,046,698 | A * | 7/1962 | Breen et al. .............. 47/52 |
| 3,057,115 | A | 10/1962 | Bilanin |
| 3,156,069 | A | 11/1964 | Lamb |
| 3,204,370 | A * | 9/1965 | Lamb ..................... 47/52 |
| 4,063,570 | A | 12/1977 | Mitchell et al. |
| 4,232,704 | A | 11/1980 | Becker et al. |
| 4,284,097 | A | 8/1981 | Becker et al. |
| 4,299,053 | A | 11/1981 | Foote |
| 4,765,372 | A | 8/1988 | Beecher |
| 4,887,387 | A | 12/1989 | Lesquir |
| 4,926,597 | A | 5/1990 | Landry |
| 5,085,076 | A | 2/1992 | Engelmann |
| 5,564,227 | A * | 10/1996 | Chabot .................. 47/52 |
| 6,438,895 | B1 | 8/2002 | Fortier |
| 7,128,088 | B2 | 10/2006 | Andersson |
| 2011/0173881 | A1 * | 7/2011 | Perkins ................. 47/52 |

FOREIGN PATENT DOCUMENTS

| CA | 1158868 | 12/1983 |
|---|---|---|
| CA | 2233739 | 9/1999 |

* cited by examiner

*Primary Examiner* — Frank T Palo
(74) *Attorney, Agent, or Firm* — Hodgson Russ LLP (57) ABSTRACT

A dual-line spout for maple syrup production is disclosed. The spout has a nose section with an input channel, and an interior chamber having first and second flow paths each fluidly connected to the input channel and to respective first and second output channels. The spout is designed for use with vacuum-based maple syrup productions systems that use a dual-line line system. The dry-line portion of the line system fluidly connects to the first output channel and the wet-line portion of the line system fluidly connected to the second output channel. Example spouts have no chambers, a single chamber or two sub-chambers, to facilitate air-liquid separation. Methods of using the spout in a vacuum-based, dual-line maple syrup production system are also disclosed.

20 Claims, 9 Drawing Sheets

DUAL-LINE SPOUT AND MAPLE SYRUP PRODUCTION SYSTEM USING SAME

CROSS-REFERENCE TO RELATED APPLICATIONS

The present application is a related to U.S. patent application Ser. No. 12/657,340, entitled "Maple syrup spout with interior chamber and maple syrup production system using same," filed on Jan. 19, 2010, which application is incorporated by reference herein.

The present application is also related to U.S. patent application Ser. No. 12/657,333, entitled "Maple syrup line system with increased diameter lines and fittings," filed on the same day as the present application, and which application is incorporated by reference herein.

FIELD OF THE INVENTION

The present invention relates generally to maple syrup production, and in particular relates to a dual line spout and a maple syrup production system that uses the spout.

BACKGROUND ART

Maple syrup production involves drilling holes into (i.e., "tapping") maple trees, collecting the sap that exudes from the wound, and then reducing or "sugaring" down the sap using reverse osmosis and evaporators to form the final syrup. Details of maple syrup production are described in the publication entitled "North American Maple Syrup Producers Manual" (second edition), produced by Ohio State University, in cooperation with the North American Maple Syrup Council, and edited by Heiligmann, Koelling and Perkins, which is incorporated by reference herein by way of background information.

The traditional way of collecting maple sap uses buckets at the tap source. The sap is then collected in a tank and then transported to the "sugarhouse" for processing. Over the years, a variety of specialized hardware has been developed for this task, including both sap spouts and specialized sap collection buckets or bags. For many years, however, the basic techniques of maple syrup and sugar production remained essentially unchanged.

More recently, modern syrup producers have replaced the traditional bucket collection system with a tubing system that includes special spouts (usually 5/16" outside diameter (OD) or 7/16" OD diameter) and plastic tubing "droplines" (usually 5/16" ID diameter and about 18" to 36" in length) connected to the various spouts. The droplines are then connected to lateral lines (also usually formed from 5/16" ID diameter plastic tubing) that run between different maple trees. The lateral lines are in turn connected to one or more "main lines" (usually 3/4" to 2" diameter) that run to the sugar house. Such systems are described in, for example, U.S. Pat. Nos. 2,877,601, 2,944, 369, 3,046,698, and 3,057,115, and may either be gravity fed or utilize a vacuum pump to move the sap to a central collection point (e.g., an evaporator in the sugarhouse).

The sap flows from the tree through the spout and then through the line system when the pressure within the tree is greater than that in the lines. The line system eventually conveys the sap to the evaporator. To facilitate the extraction and transportation of the sap from the tree and to the evaporator, some systems use a pump to pull a vacuum within the line system. This increases the pressure differential between the inside of the line system and the tree, thereby increasing the volume of sap flow as compared to that which would naturally occur by gravity.

Figure 1:
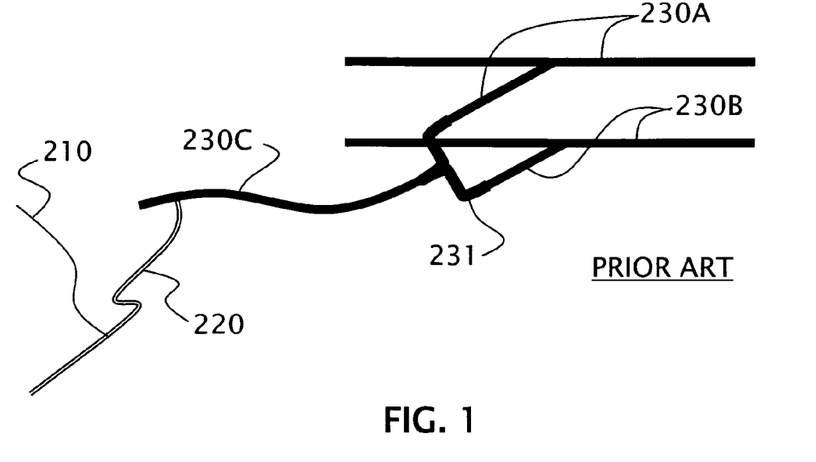
FIG. 1 is a schematic diagram of a portion of a prior art dual-line line system showing how the dual lines terminate within the main-line portion of the system.

FIG. 1 is a schematic diagram that illustrates a portion of a dual-line system that includes a top mainline 230A suspended slightly above a bottom mainline 230B. At intervals along the dual mainlines, a manifold 231 connects the top and bottom mainlines lines to a third main line 230C that has individual lateral lines 220. Spouts (not shown) are connected to the lateral lines 220 via drop lines 210. While this dual-line system generally improves sap yield, the dual-line portion runs from the vacuum pump system and terminates in the main line portion of the system, which limits its effectiveness.

SUMMARY OF THE INVENTION

An aspect of the invention is a spout for inserting into a tap hole formed in a maple tree as part of a maple syrup production system that utilizes a dual-line line system under vacuum to convey sap from the maple tree using first and second drop lines. The spout includes a nose section having an input channel and an end adapted for operable insertion into the tap hole. The spout also includes a main body section fluidly connected to the nose section via the input channel and having first and second flow paths fluidly connected to the input channel. The spout also has first and second output channels respectively fluidly connected to the first and second flow paths and configured to fluidly connect to respective first and second drop lines.

Another aspect of the invention is a maple syrup production system that uses the above-described spout, with its nose section end inserted into the tap hole. The production system includes a dual-line line system having wet lines and dry lines respectively operably connected to the first and second output channels and to a vacuum pump. The vacuum pump creates a vacuum differential between the line system and the tap hole that causes a) air to flow from the tap hole, through the input channel and over the first flow path and through the dry lines of the dual-line line system, and b) the sap to flow from the tap hole, through the input channel and over the second flow path and through the wet lines of the dual-line line system.

Another aspect of the invention is a method of extracting sap from a maple tree. The method includes providing a spout having a nose section with an input channel, and a main body section having an output end and that defines first and second flow paths fluidly connected to the input channel and to respective first and second output channels at the output end. The method also includes forming a tap hole in the maple tree and then inserting the spout nose section into the tap hole. The method also includes applying a vacuum to the first and second output channels, thereby conveying air over the first flow path and down the first output channel and conveying sap over the second flow path and down the second output channel.

Another aspect of the invention is a spout for maple syrup production. The spout includes a main body section having an output end and an interior chamber divided into first and second sub-chambers by a divider having a gap that fluidly connects the first and second sub-chambers. The spout also includes a nose section having a removable nose portion that press fits to a nose adapter section of the main body section. The nose section has an input channel fluidly connected to the second sub-chamber. The spout also includes first and second output channels respectively fluidly connected to the first and second sub-chambers and at least partially defined by respective first and second drop-line fittings that extend from the output end.

Another aspect of the invention is a spout for inserting into a tap hole formed in a maple tree as part of a maple syrup production system that utilizes a line system under vacuum to convey sap from the maple tree using first and second drop lines. The spout includes a nose section having an input channel with an output end, with the nose section having an end adapted for operable insertion into the tap hole. The spout also includes a main body section having an output end and first and second output channels respectively fluidly connected to the output end of the input channel. The spout also includes first and second drop-line fittings extending from the main body at the output end and that respectively contain at least a portion of the first and second output channels, and configured to respectively fluidly connect to the first and second drop lines via a press-fit connection.

Additional features and advantages of the invention are set forth in the detailed description that follows, and in part will be readily apparent to those skilled in the art from that description or recognized by practicing the invention as described herein, including the detailed description that follows, the claims, as well as the appended drawings.

It is to be understood that both the foregoing general description and the following detailed description present embodiments of the invention, are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

BRIEF DESCRIPTION OF THE DRAWINGS

FIG. 3 is a front-on view,

FIG. 4 is a front-on cut-away view, and

In the Figures, like reference numbers and symbols are used to describe like parts.

DETAILED DESCRIPTION

In the description below, the term "fluidly connected" generally means that a fluid can flow between two points in a controlled and contained manner, and includes techniques known in the art of maple syrup production to connect parts of the production system so that fluid can flow between or through the parts. An exemplary technique for fluidly connecting two different fluid-carrying parts is a press-fit technique where the end of one part (e.g., a drop line 210, described below) is slid over the end of another part (e.g., a fitting 36, as described below) and pressed thereon to provide a snug fit that is fluid-tight and vacuum tight. Other connecting techniques that are available for forming fluid connections employ threaded parts or snap-fit parts. However, the present invention is described below using the above-mentioned "press fit" connection technique because it is presently the most widely accepted connection technique in the maple syrup industry.

Also, while the present invention works well with 5/16" inside diameter (ID) lines (i.e., drop line, lateral lines, etc.), it also works with larger-diameter lines according to the line systems and methods described in the aforementioned U.S. patent application Ser. No. 12/657,333, entitled "Maple syrup line system with increased diameter lines and fittings." Accordingly, the description of the line system 208 below includes embodiments using both conventional 5/16" ID lines as well as the aforementioned larger-diameter lines, or a combination thereof.

Figure 2:
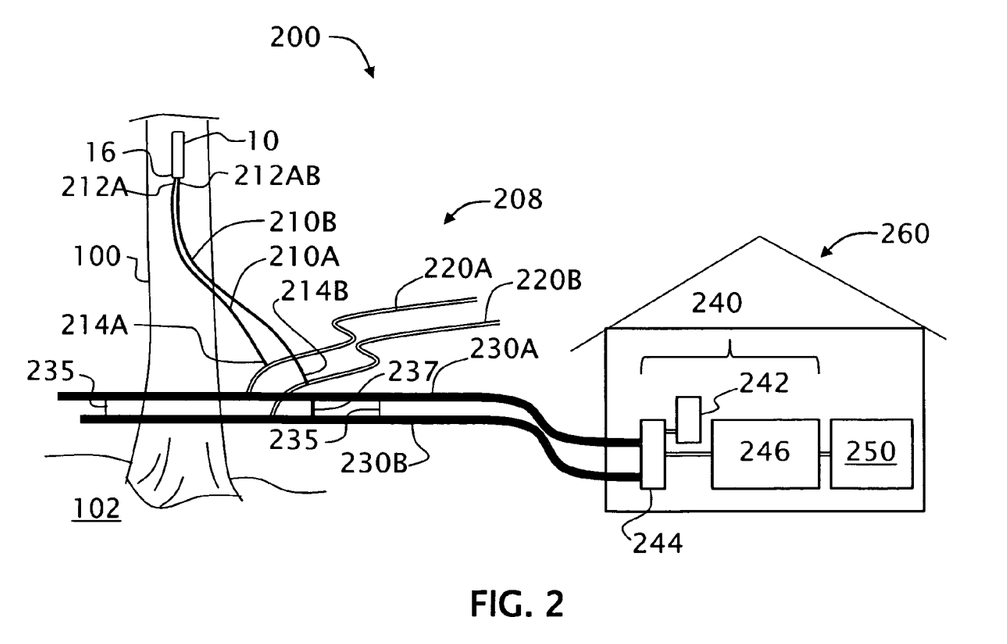
FIG. 2 is a schematic diagram of a vacuum-based, dual-line maple syrup production system that uses the dual-line spout of the present invention.

FIG. 2 shows a schematic diagram of an example vacuum-based, dual-line maple syrup production system 200 that includes a dual-line spout 10, various examples of which are described in greater detail below. Dual-line spout 10 is connected to tree 100 at a tap hole (not shown; see 110, FIGS. 10 and 11) formed therein. System 200 includes a dual-line line system 208 that includes two droplines 210A and 210B, two lateral lines 220A and 220B and two main lines 230A and 230B. Dual droplines or dual lateral lines may be comprised of two separated lines or two joined lines. The dropline 210A, the lateral line 220A and the main line 230A constitute a "dry line" portion or the "dry lines" of line system 200 and carry air, and that are used to pull a vacuum on the line system. Likewise, the dropline 210B, the lateral line 220B and the main line 230B constitute a "wet line" portion or "wet lines" of line system and are used to convey sap 270. Under some flow conditions, sap 270 may be conveyed for periods of time in the "dry" line. Also, an example line system 208 includes a manifold or connector line 237 to occasionally allow sap 270 that comes down a "dry" line to be transferred to a "wet" line.

First and second ends 212A and 212B of respective drop lines 210A and 210B are fluidly connected to an output end 16 of dual-line spout 10, while the opposite drop line ends 214A and 214B are fluidly connected to respective lateral lines 220A and 220B.

Lateral lines 220A and 220B are in turn operably connected to respective mainlines 230A and 230B, which in turn are operably connected to a vacuum pump system 240. Vacuum pump system 240 includes a vacuum pump 242, an extractor 244 and a sap storage tank 246. An evaporator 250 is operably connected to vacuum pump system 240. Vacuum pump 242, extractor 244, storage tank 246 and evaporator 250 are shown as housed in a sugarhouse 260. System 200 thereby provides vacuum-assisted fluid communication between tap hole 110 and evaporator 250 so that sap can flow from tree 100 to the evaporator via the wet-line portion of dual-line line system 208. It is noted here that "fluid communication" refers to both the sap as a fluid and the air in the line system as a "fluid." Said differently, line system 208 is sufficiently airtight and fluid-tight so that vacuum system 240 can pull a sufficient vacuum (e.g., 15-28 inches of mercury) on both the dry-line and wet-line portions of dual-line line system 208.

Note that the two separate main lines 230A and 230B are arranged such that the "dry" (i.e., air-carrying) main line 240A is suspended above the "wet" (i.e., sap-carrying) main line 230B (e.g., by about 1 foot). Both mainlines 230A and 230B are held in place using, for example, support wire 235 or with mainline designed and constructed to be installed without a support wire. The upper main line 230A is typically the same size as or slightly larger than the lower main line 230B.

In operation of system 200, sap 270 (see, e.g., FIG. 11) runs out of tree 100 through dual-line spout 10 and into "wet" drop line 210B, then to lateral line 220B and then to main line 230B (FIG. 2). The "dry" drop line 210A provides an additional path for extracting air and pulling a vacuum, which allows for establishing a better vacuum over dual-line line system 208. In this way, air can easily move quickly and freely down to vacuum pump system 240 through the dry-line portion of dual-line line system 208, while sap 270 can be conveyed down the wet-line portion of the system in a less turbulent manner. The result is that both air (vacuum) and sap are respectively transferred more quickly and efficiently to vacuum pump 242 and evaporator 250, thereby providing better transfer of vacuum a greater distance from sugarhouse 260, which allows for a greater number of trees 100 (including more distant trees) to be tapped. This translates into greater sap yield.

The dual-line line system 208 of system 200 need not have dual lines all the way back to vacuum pump system 240. For example, lateral lines 220 can be tied into a single main line 230 that runs to vacuum pump system 240. Or, the two droplines 210 can be tied to a common lateral line 220. Thus, the definition of a "dual-line" line system as the term is used herein generally includes a line system having two drop lines 210A and 210B respectively connected to the two drop-line fixtures 38A and 38B of dual-line spout 10. The present invention is discussed in connection with an exemplary dual-line line system 208 that includes dual lines between dual-line spout 10 and vacuum pump system 240 because this particular embodiment is believed to be the most efficient sap-collecting system.

Dual-Line Spout with Two Sub-Chambers

Figure 3:
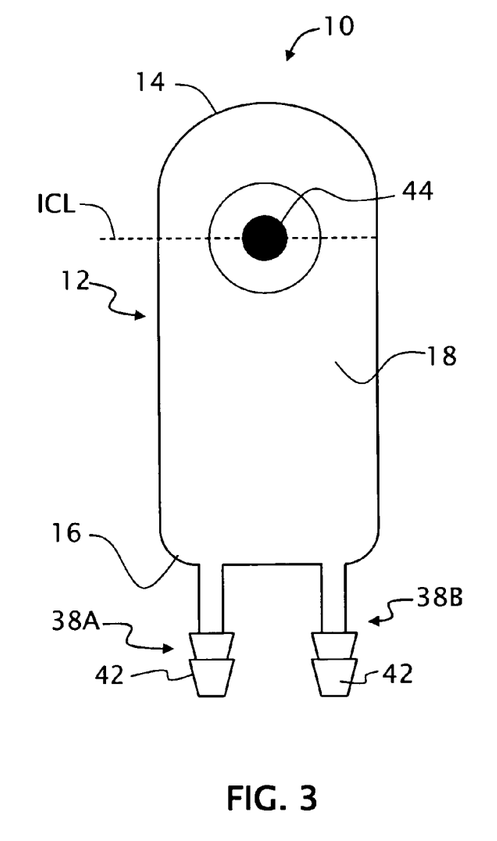
Figure 4:
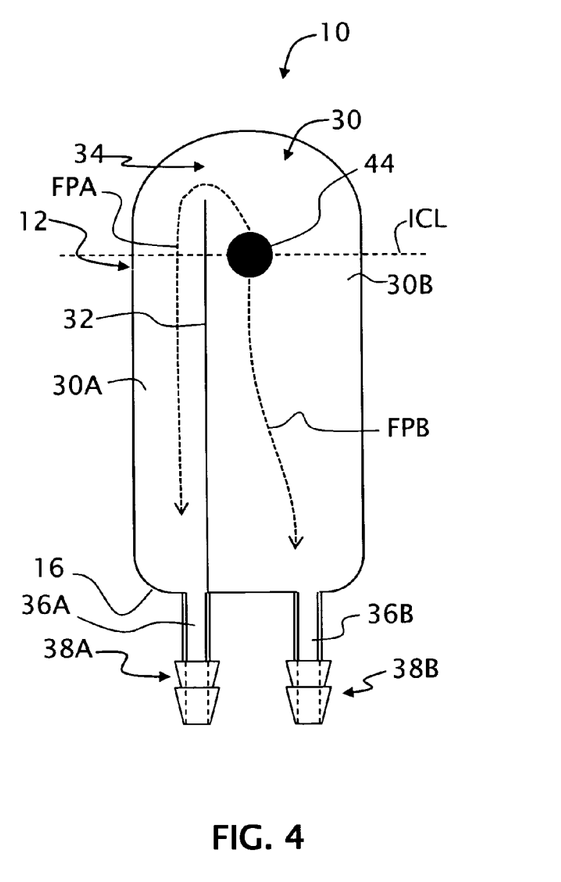
Figure 5:
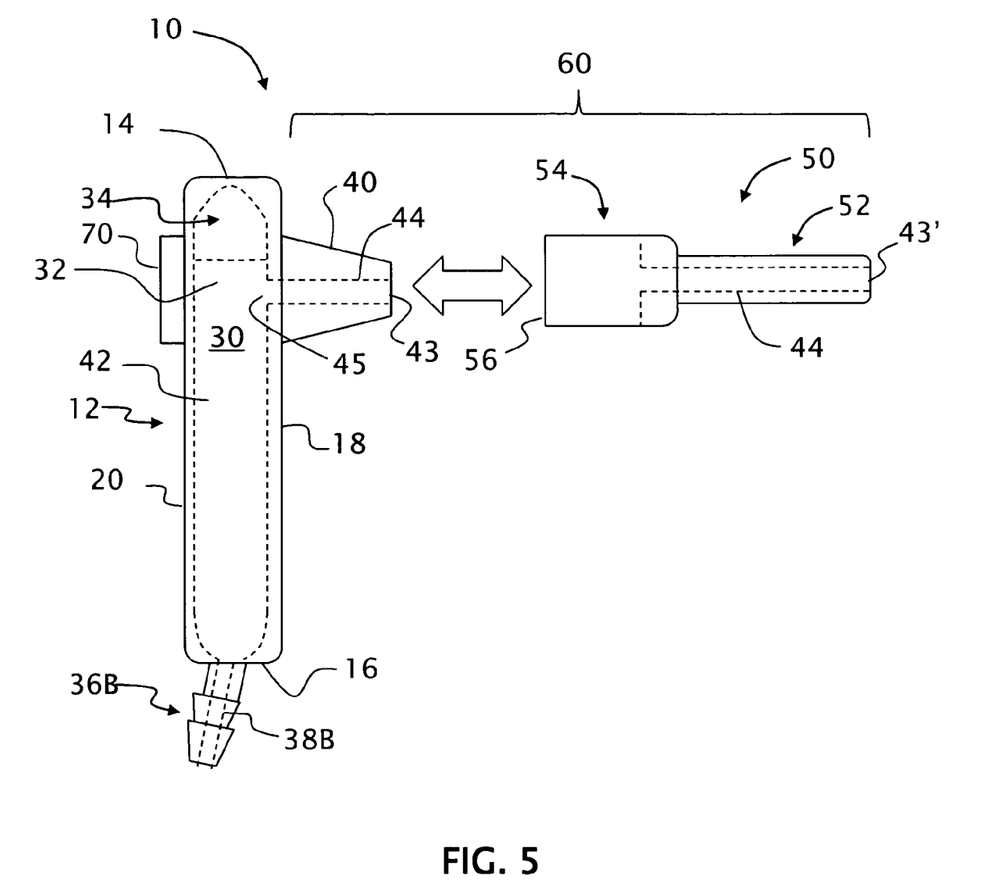
FIG. 5 is a side-view of an example dual-line spout of the present invention that includes an internal chamber divided into two fluidly connected sub-chambers.

FIG. 3 is a front-on view, FIG. 4 is a front-on cut-away view, and FIG. 5 is a side-view of an example dual-line spout 10. Dual line spout 10 includes a main body section 12 having an upper end 14, the aforementioned lower output end 16, a front side 18 and a back side 20. In an example embodiment, main body section 12 is generally rectangular but is shown with an optional rounded upper end 14. Body section 12 includes an internal chamber 30 that is open to the outside at output end 16 via two output channels 36A and 36B. In an example embodiment, output channels 36A and 36B are respectively at least partially defined by drop-line fittings (i.e., drop-line connectors) 38A and 38B. In an example embodiment, drop-line fittings 38A and 38B extend from lower output end 16 and have ends configured with ridges 42 so that droplines 210A and 210B can slide over and snugly engage the respective drop-line fittings and form a water-tight and vacuum-tight seal (see e.g., FIG. 10).

In an example embodiment, chamber 30 includes a divider 32 that divides the chamber into two adjacent and fluidly connected sub-chambers 30A and 30B. Divider 32 runs from lower end 16 up toward upper end 14 and is located off-center towards output channel 36A so that the output end 45 of input channel 44 (discussed below) resides in sub-chamber 30B. In one example, divider 32 stops short of upper end 14, thereby forming a gap 34 adjacent upper end 14 and through which sub-chambers 30A and 30B are fluidly connected. In other examples, divider 32 runs from lower end 16 to upper end 14 but includes a gap (e.g., an aperture) 34 somewhere between an input channel level ICL (associated with center of input channel 44) and the main body upper end 14.

An air flow path FPA and a sap flow path FPB are formed within chamber 30 and are discussed in greater detail below.

An example dual-line spout 10 is formed as an assembly and includes a nose adapter section 40 on front side 18 closer to upper end 14. Nose adapter section defines an input channel 44 having an input end 43 and an output end 45. Nose adapter section 40 is configured to accommodate a removable nose portion 50 having a front-end section 52 and a back end section 54. Back end section 54 has an open end 56 and is configured to press fit to the nose adapter section 40 so that removable nose 40 and main body section 12 are fluidly connected. Removable nose portion 50 includes a portion of input channel 44 and has an input end 43'.

Thus, nose adapter section 40 and removable nose portion 50, when combined, form a nose section 60 having a continuous input channel 44. A flat base 70 is provided on back side 20 opposite nose adapter section 40 so that dual-line spout 10 can be hammered, pressed, or otherwise forcibly urged into tap hole 110 (see, e.g., FIG. 9) without damaging main body section 12.

Dual-Line Spout without Sub-Chambers

Figure 6:
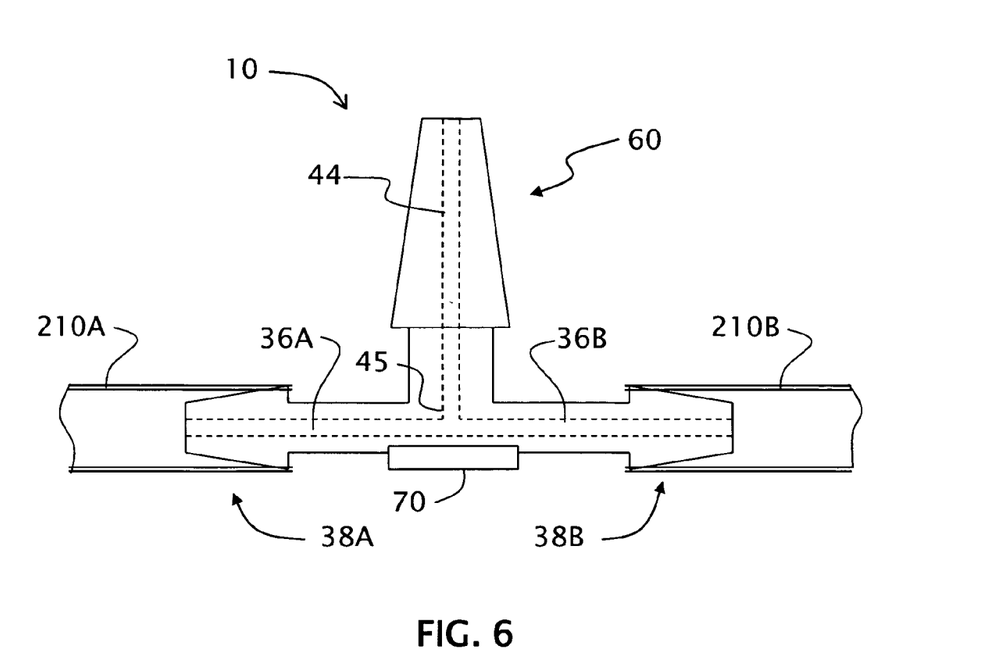
FIG. 6 is a top-down view of an example T-type dual-line spout that does not include an internal chamber.

FIG. 6 is top-down view of a simplified embodiment of dual-line spout 10 that has a "T" shape, with nose section 60 connected to drop-line fittings 38A and 38B that respectively support at least a portion of (and in some embodiments, substantially all of) first and second output channels 36A and 36B. Dual-line spout 10 of FIG. 6 represents an embodiment where there is no internal chamber 30. Rather, first and second output channels 36A and 36B are sections of a single channel that intersects and directly fluidly connects at a mid point to input channel 44 at end 45. In the dual-line spout 10 of FIG. 6, the first and second output channels 36A and 36B and the input channel 44 form a T-shape. In another example embodiment not shown, the first and second output channels 36A and 36B intersect at an angle at output end of input channel 44, thereby forming a Y-shape.

Figure 7:
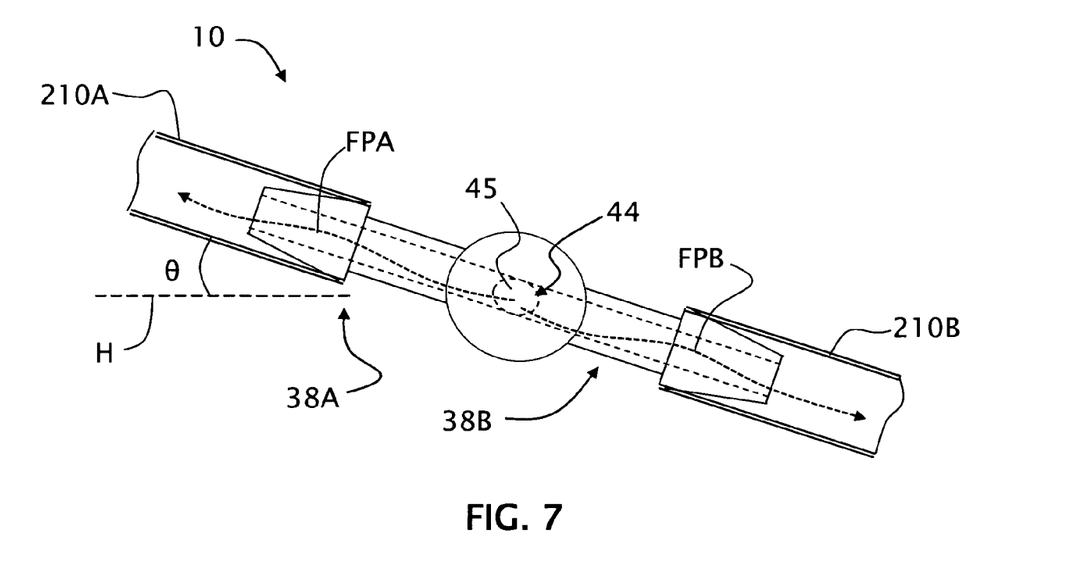
FIG. 7 is an end-on view of the T-type dual-line spout of FIG. 6, showing the orientation of the spout relative to the horizontal so that the air and sap flow paths are properly established.

FIG. 7 is a back view of the example dual-line spout 10 of FIG. 6 showing how the dual-line spout is oriented relative to a horizontal line H, which represents a plane normal to the direction of gravity (i.e., parallel to the ground). The first and second output channels 36A and 36B, which are shown as being in line (i.e., form a single, long channel), are oriented at an angle $\theta$ (e.g., between 5° and 90°) with respect to horizontal line H such that drop-line fitting 38A resides above drop-line fitting 38B. This sets up the air flow path FPA starting from input channel output end 45 and running through output channel 36A, and also sets up the sap flow patch FPB starting from input channel output end 45 and running through output channel 36B. While this particular design does not have the benefit of chamber 30 to assist in providing separation between the air and the sap, it still provides an effective and affordable alternative to a chamber-based, dual-line spout.

Figure 8:
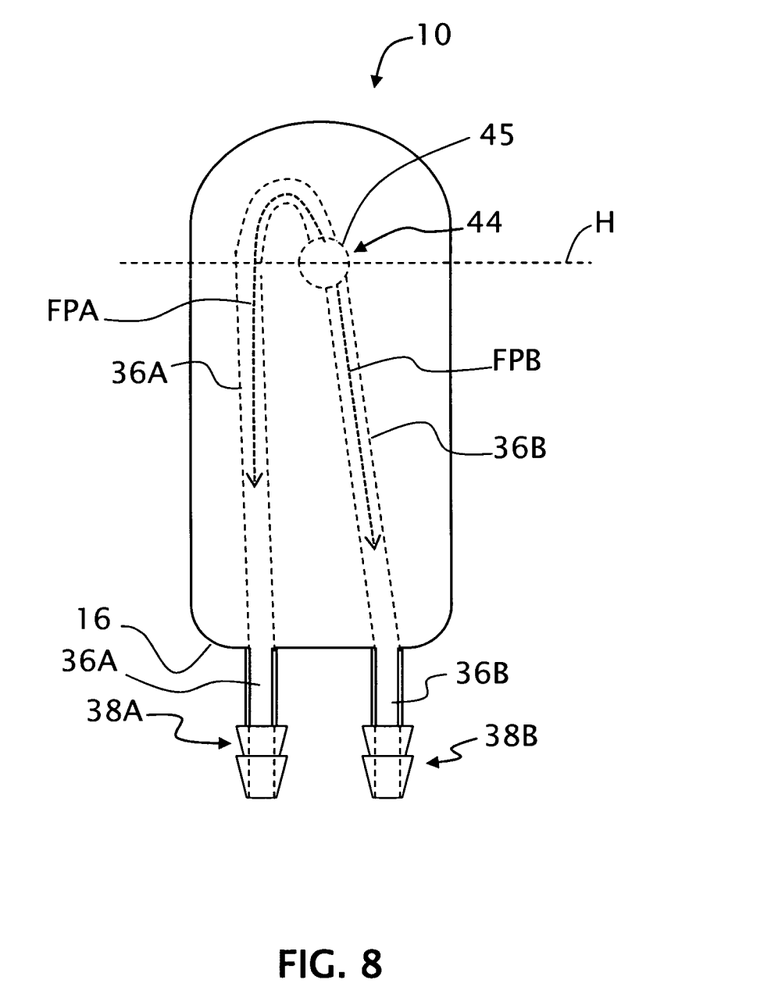
FIG. 8 is a schematic diagram of an example dual-line spout similar to that shown in FIG. 4 but that does not include an internal chamber and instead includes extended first and second output lines that fluidly connect with the input line and that define the air and sap flow paths.

FIG. 8 is a cut-away front-on view of an example dual-line spout 10 similar to that shown in FIG. 4, except that the two sub-chambers 30A and 30B have been replaced by extending the two output channels 36A and 36B all the way up to output end 45 of input channel 44. Thus, the dual-line spout of FIG.

8 is similar to that of FIG. 6 in that is a chamberless design. Note, however, that the dual-line spout of FIG. 8 is configured so that the portion of output channel 36A adjacent output end 45 of input channel 44 is above input channel level ICL. This sets up the air flow path FPA starting from input channel output end 45 and running through output channel 36A, and sets up the sap flow patch FPB starting from input channel output end 45 and running through output channel 36B. Note that drop-line fittings 38A and 38B this embodiment of dual-line spout 10 contain respective portions of output channels 36A and 36B.

Dual-Fine Spouts with Single Chamber

Figure 9A:
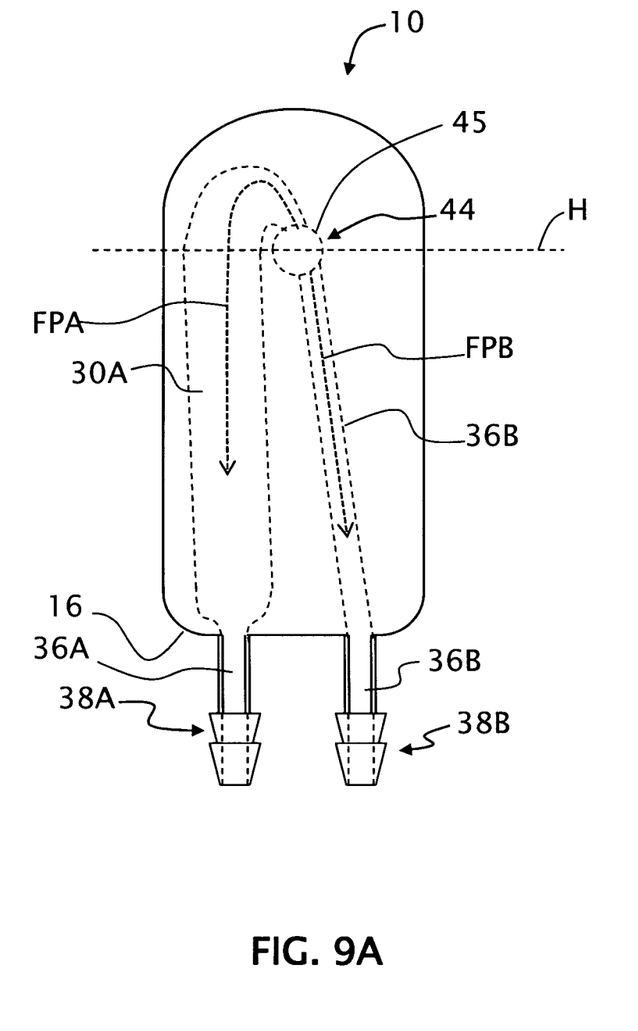
FIG. 9A is similar to FIG. 8 and shows an example embodiment of the dual-line spout that has a single chamber associated with the air flow path.
Figure 9B:
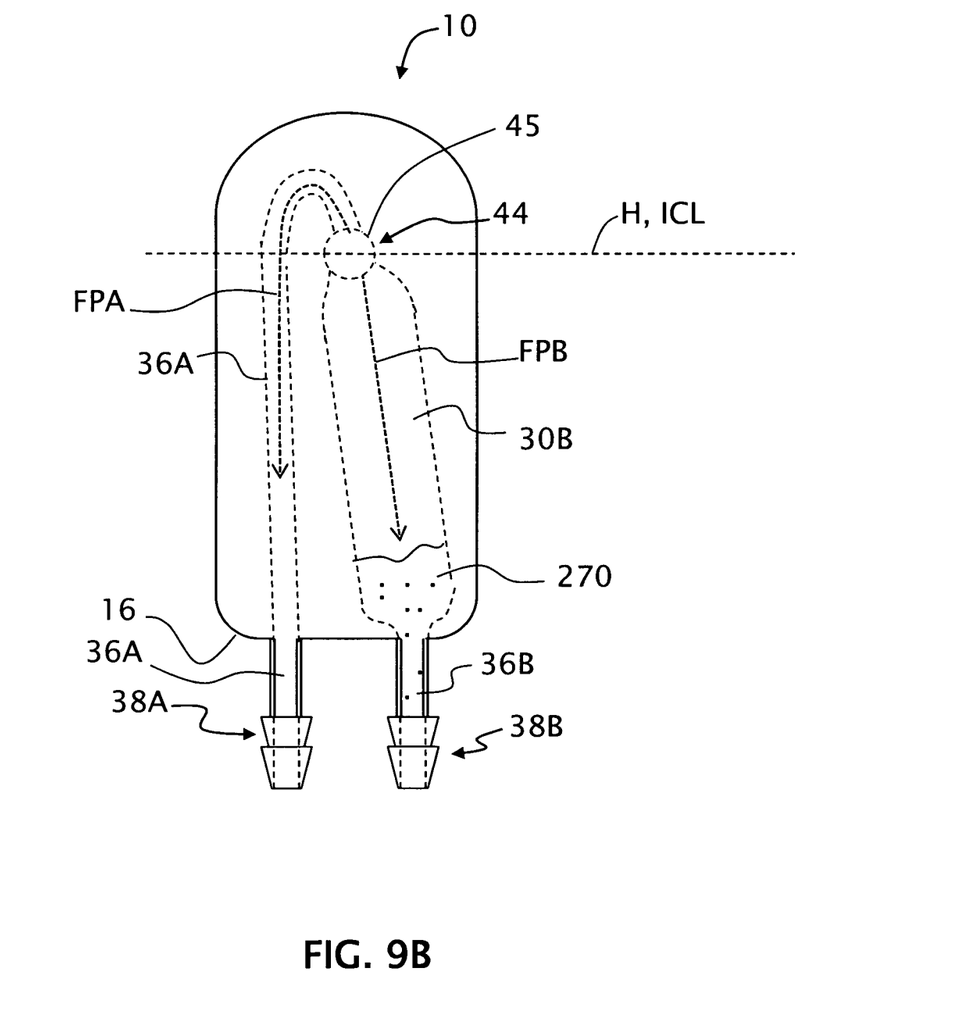
FIG. 9B is similar to FIG. 9A and shows an example embodiment of the dual-line spout that has a single chamber associated with the sap flow path.

FIG. 9A is similar to FIG. 8 and illustrates an example embodiment of dual-line spout 10 that includes a single chamber 30A (which in this case is no longer a "sub-chamber"), which serves to improve the vacuum that forms within the spout as compared to not having chamber 30A. FIG. 9B is similar to FIG. 9A except that the single chamber is chamber 30B associated with the sap flow path FPB. Chamber 30B allows more sap 270 to collect within the spout as compared to just having an output channel 36B. This can lead to improved sap flow out of output channel 36B.

Dual-Fine Spout in Tap Hole

Figure 10:
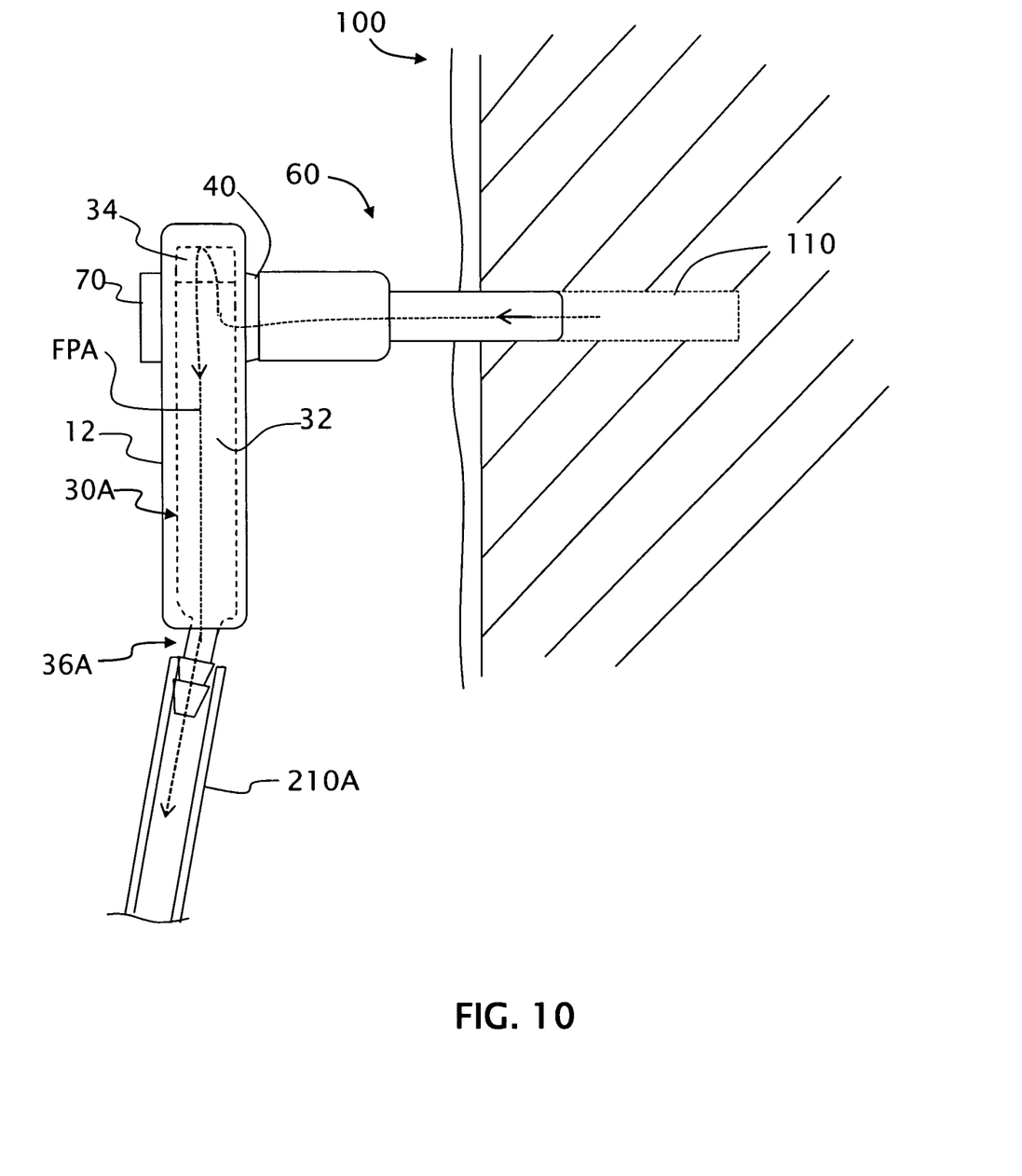
FIGS. 10 and 11 are close-up side views that shows an example two sub-chamber dual-line spout with the nose section engaged with a tap hole in a tree, wherein FIG. 10 schematically shows the air flow path and FIG. 11 schematically shows the sap flow path.
Figure 11:
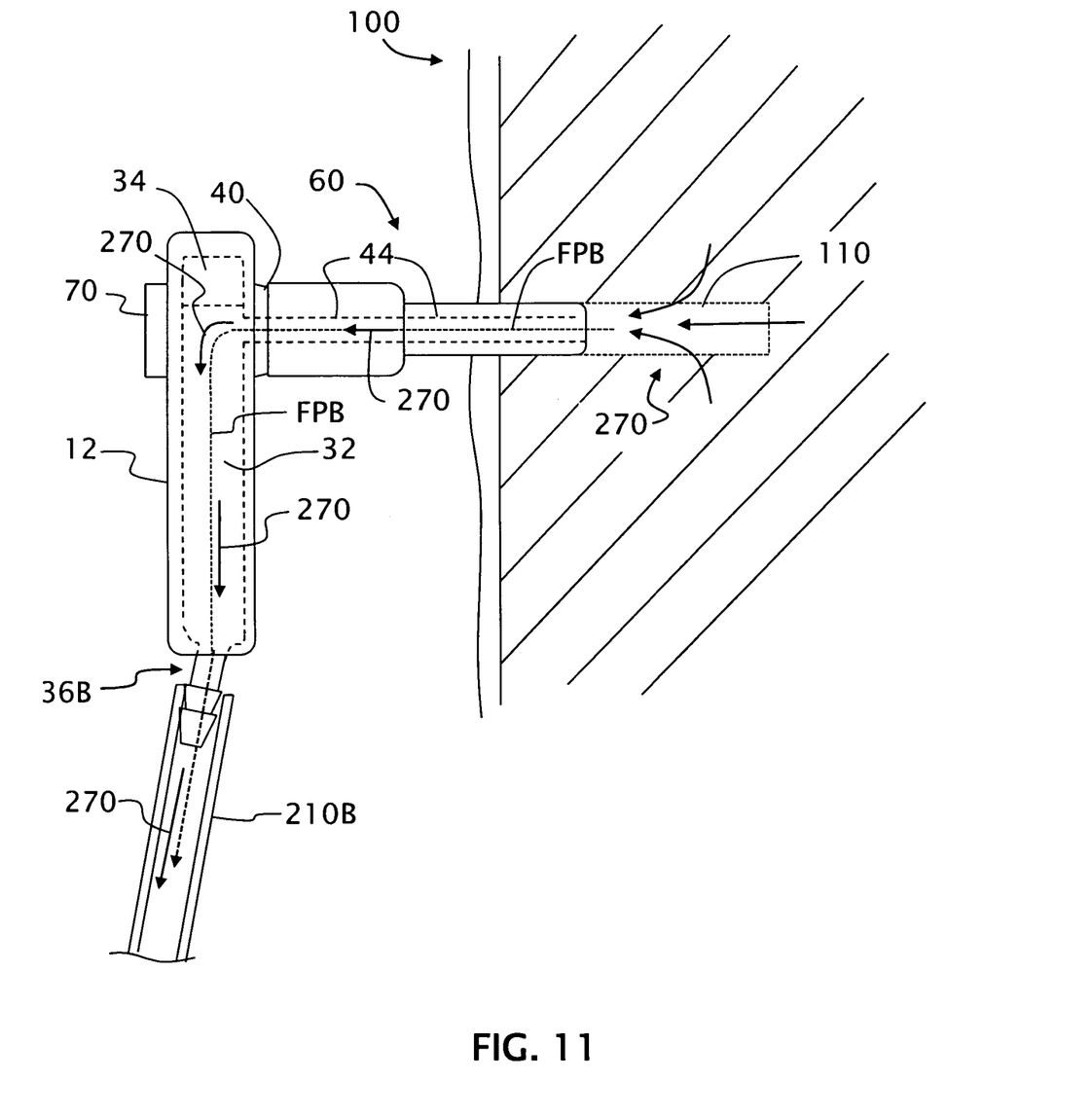

FIGS. 10 and 11 are close-up side views that show an example dual-line spout 10 with nose section 60 engaged with tap hole 110 of tree 100, which is shown in cross-section. The view in FIG. 10 shows in phantom cross-sectional features associated with sub-chamber 36A (including divider 32), while the view in FIG. 11 shows cross-sectional features associated with sub-chamber 36B.

With reference to FIGS. 10 and 11 and also to FIGS. 1 and 4, application of a vacuum on dry drop-lines 210A and 210B combined with the dual sub-chamber configuration of chamber 30 creates an air flow path FPA and a sap flow path FPB. The sap flow path FPB (FIG. 11) causes sap 270 to flow out of the tap hole 110 and through input channel 44. When sap 270 exits input channel 44 at output end 45, gravity causes essentially all of the sap to fall into sub-chamber 30B, while the vacuum within chamber 30 causes air to flow out of channel 44 and then upwards and through gap 34 and then into sub-chamber 30A. Note that some sap 270 can be drawn upwards to travel over air flow path FPA without significantly diminishing the advantageous effects of the dual-line configuration.

Thus, all of, or at least the vast majority of sap 270 flows out of sub-chamber 30B via output channel 38B of drop-line fitting 36B, and then into dropline 210B, which is slide-connected to drop-line fitting 36B. Sap 270 is then conveyed by the urging force of the vacuum as well as by gravity to evaporator 250 over the rest of line system 208 as described above in connection with system 200 of FIG. 1. Likewise, air from chamber 30A is drawn through output channel 38A of drop-line fitting 36A, and then into dropline 210A, which is slide-connected to drop-line fitting 36A. The air is then pulled through the rest of the dry-line portion of dual-line line system 208 down to vacuum pump system 240.

System 200 employing non-chamber or single-chamber embodiments of dual-line spout 10 operate in a similar manner as described above, except that the flow paths FPA and FPB are established either directly in respective output channels 36A and 36B from input channel 44 rather than first through respective sub-chambers 30A and 30B, or are established through the single chamber 30A or 30B.

In example embodiments, dual-line spout 10 is made from food-grade nylon or plastic via injection molding.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A spout for inserting into a tap hole formed in a maple tree as part of a maple syrup production system that utilizes a dual-line line system under vacuum to convey sap from the maple tree using first and second drop lines, comprising:
   a nose section having an input channel and an end adapted for operable insertion into the tap hole;
   a main body section fluidly connected to the nose section via the input channel and having first and second flow paths fluidly connected to the input channel; and
   first and second output channels respectively fluidly connected to the first and second flow paths and configured to fluidly connect to respective first and second drop lines.

2. The spout of claim 1, wherein the main body includes an interior chamber divided into first and second fluidly connected sub-chambers, and wherein the first and second flow paths are at least partially defined by the respective first and second sub-chambers.

3. The spout of claim 1, wherein the first and second output channels are defined by respective first and second drop-line fittings configured to respectively press-fit with the first and second drop lines.

4. The spout of claim 1, wherein the first and second output channels respectively define the first and second flow paths.

5. The spout of claim 1, wherein the nose section comprises a removable nose portion that press fits to a nose adapter section on the main body section so that the nose portion is fluidly connected to and removable from the main body portion.

6. The spout of claim 2, wherein the first and second connected sub- chambers are defined by a dividing member within the interior chamber, wherein the dividing member defines a gap that connects the first and second sub-chambers, wherein the gap resides between an input-channel-level of the spout and an upper end of the spout.

7. A maple syrup production system, comprising:
   the spout of claim 1, with its nose section end inserted into the tap hole; and
   a dual-line line system having wet lines and dry lines respectively operably connected to the first and second output channels and to a vacuum pump that creates a vacuum differential between the line system and the tap hole that causes a) air to flow from the tap hole, through the input channel and over the first flow path and through the dry lines of the dual-line line system, and b) the sap to flow from the tap hole, through the input channel and over the second flow path and through the wet lines of the dual-line line system.

8. A method of extracting sap from a maple tree, comprising:
   providing a spout having a nose section adapted for operable insertion into a tap hole, the nose section having an input channel, and a main body section having an output end and that defines first and second flow paths fluidly connected to the input channel and to respective first and second output channels at the output end;
   forming the tap hole in the maple tree;
   inserting the spout nose section into the tap hole; and
   applying a vacuum to the first and second output channels thereby conveying air over the first flow path and down the first output channel and conveying sap over the second flow path and down the second output channel.

9. The method of claim 8, further comprising providing the first and second flow paths with respective first and second fluidly connected sub-chambers, with the second sub-chamber being fluidly connected to the input channel.

10. The method of claim 9, further comprising defining the first and second sub-chambers using a divider in an internal chamber to form a gap that connects the first and second sub-chambers.

11. The method of claim 8, further comprising forming the nose section by press fitting a removable nose portion to a nose adapter section on the main body.

12. The method of claim 8, wherein applying the vacuum includes:
    providing a dual-line line system having a dry-line portion and a wet-line portion;
    connecting the dry-line portion to the first output channel and the wet-line portion to the second output channel; and
    applying the vacuum to the dry-line and wet-line portions.

13. The method of claim 8, further comprising providing first and second drop-line fittings that extend from the output end and that at least partially define the respective first and second output channels.

14. A spout for maple syrup production, comprising:
    a main body section having an output end and an interior chamber divided into first and second sub-chambers by a divider having a gap that fluidly connects the first and second sub-chambers;
    a nose section having a removable nose portion that press fits to a nose adapter section of the main body section, the nose section having an input channel fluidly connected to the second sub-chamber; and
    first and second output channels respectively fluidly connected to the first and second sub-chambers and at least partially defined by respective first and second drop-line fittings that extend from the output end.

15. The spout of claim 14, further comprising first and second drop lines respectively press fitted to the first and second drop line fittings.

16. A spout for inserting into a tap hole formed in a maple tree as part of a maple syrup production system that utilizes a line system under vacuum to convey sap from the maple tree using first and second drop lines, comprising:
    a nose section having an input channel with an output end, the nose section having an end adapted for operable insertion into the tap hole;
    a main body section having an output end and first and second output channels respectively fluidly connected to the output end of the input channel; and
    first and second drop-line fittings extending from the main body at the output end and that respectively contain at least a portion of the first and second output channels, and configured to respectively fluidly connect to the first and second drop lines via a press-fit connection.

17. The spout of claim 16, wherein the first and second output lines and the input line form a T shape or a Y-shape.

18. A maple syrup production system, comprising:
    the spout of claim 16, with its nose section end inserted into the tap hole; and
    a dual-line line system having wet lines and dry lines respectively operably connected to the first and second output channels and to a vacuum pump that creates a vacuum differential between the line system and the tap hole that causes a) air to flow from the tap hole, through the input channel, over the first output channel and through the dry lines of the dual-line line system, and b) the sap to flow from the tap hole, through the input channel, over the second output channel and through the wet lines of the dual-line line system.

19. A method of extracting sap from a maple tree, comprising:
    providing the spout of claim 16;
    forming a tap hole in the maple tree;
    inserting the spout input end into the tap hole; and
    applying a vacuum to the first and second output channels thereby conveying air through the first output channel and conveying sap through the second output channel.

20. The method of claim 19, further comprising conveying the sap to an evaporator over a wet-line portion of a dual-line line system and conveying air to a vacuum system over a dry-line portion of the dual-line line system.

* * * * *